United States Patent
Gardes et al.

(10) Patent No.: US 8,942,867 B2
(45) Date of Patent: Jan. 27, 2015

(54) PROCEDURE AND DEVICE FOR THE DETERMINATION OF AIRSPEEDS OF A ROTORCRAFT IN STATIONARY FLIGHT AND/OR AT LOW SPEEDS

(71) Applicant: Airbus Helicopters, Marignane, Cedex (FR)

(72) Inventors: Jerome Gardes, Aix en Provence (FR); Jean-Paul Pinacho, Molleges (FR); Philippe Gaulene, Marignane (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/910,532

(22) Filed: Jun. 5, 2013

(65) Prior Publication Data
US 2013/0325220 A1    Dec. 5, 2013

(30) Foreign Application Priority Data
Jun. 5, 2012 (FR) ...................... 12 01609

(51) Int. Cl.
| | |
|---|---|
| G06F 19/00 | (2011.01) |
| B64C 27/00 | (2006.01) |
| B64D 43/02 | (2006.01) |
| B64F 5/00 | (2006.01) |
| G01P 5/00 | (2006.01) |
| G01P 21/02 | (2006.01) |

(52) U.S. Cl.
CPC .............. *B64D 43/02* (2013.01); *B64F 5/0045* (2013.01); *G01P 5/00* (2013.01); *G01P 21/02* (2013.01)
USPC .......................................... 701/14; 244/17.11

(58) Field of Classification Search
USPC .............. 701/14, 15, 16, 7; 244/17.13, 17.11, 244/196, 197, 194, 6, 8, 223, 232, 233
See application file for complete search history.

(56) References Cited

U.S. PATENT DOCUMENTS

| | | | | |
|---|---|---|---|---|
| 4,829,441 A | * | 5/1989 | Mandle et al. | ................... 702/96 |
| 5,063,777 A | * | 11/1991 | Arethens et al. | ............ 73/178 H |

FOREIGN PATENT DOCUMENTS

| | | |
|---|---|---|
| EP | 0402224 A1 | 12/1990 |
| FR | 2613078 A1 | 9/1988 |
| FR | 2885222 A1 | 11/2006 |

OTHER PUBLICATIONS

"Development and Application of an Integrated Framework for Small UAV Flight Control Development" Yew Chai Paw et al. vol. 21, No. 5. (Aug. 2011) pp. 789-802, XP028226794; ISSN:0957-4158, DOI: 10.1016. Article available on line Oct. 23, 2010.
Search Report and Written Opinion; Application No. FR1201609; dated: Mar. 15, 2013.

* cited by examiner

*Primary Examiner* — Muhammad Shafi
(74) *Attorney, Agent, or Firm* — Brooks Kushman P.C.

(57) ABSTRACT

A procedure and a device for the determination of current airspeeds [13] of a rotorcraft [2] in a stationary flight regime and/or at low speeds. A calculation system [1] incorporates two pairs of polynomial calculation laws [9] [10] that are executable successively by pairs. A pair of first polynomial laws [9] calculates estimated airspeeds [11], consisting respectively of longitudinal and lateral airspeeds, and is constructed through multilinear regression based on parameters relating to simulated flight points [17] defined by means of a flight simulator [18]. A pair of second polynomial laws [10] calculates the current airspeeds based on the estimated airspeeds [11], and is constructed through multilinear regression based on parameters relating to test-flight points defined by means of test flights [25].

20 Claims, 1 Drawing Sheet

PROCEDURE AND DEVICE FOR THE DETERMINATION OF AIRSPEEDS OF A ROTORCRAFT IN STATIONARY FLIGHT AND/OR AT LOW SPEEDS

CROSS REFERENCE TO RELATED APPLICATIONS

This application claims priority to French patent application No. FR 1201609 filed Jun. 5, 2012, the disclosure of which is incorporated in its entirety by reference herein.

BACKGROUND OF THE INVENTION (1) Field of the Invention

The present invention involves the aircraft field, and pertains to procedures for measuring the speed of the aircraft in relation to a surrounding fluid. More specifically, the present invention relates to the procedures for determining the airspeed of a rotorcraft performing evolutions during stationary flight and/or at low speeds.

(2) Description of Related Art

The present invention relates to a procedure for the determination of the current airspeeds of a rotorcraft performing evolutions during stationary flight and/or at low speeds. The determined airspeeds correspond in particular to a longitudinal airspeed $LAS_{Vy}$ and a lateral airspeed $LAS_{Vx}$ of the rotorcraft. The concepts of stationary and low-speed flight should be viewed as being analogous to a rotorcraft flight regime evolving at a speed that is less than or equal to a forward-speed threshold of a rotorcraft as generally accepted. For illustrative purposes but non-restrictively, such a speed threshold corresponds to a forward speed of the rotorcraft that is, for example, lower than 40 knots (Kt).

Rotorcraft are aircraft that have the particular capability of being able to perform evolutions in stationary flight and/or at low speeds. Rotorcraft include at least one main rotor that provides their support and often also their propulsion as well, and at least one anti-torque device, such as, for example, an anti-torque rotor, it makes it possible to control the movements of the rotorcraft in yaw. These rotors include a rotating wing that includes blades. To modify the forward modes of the rotorcraft, a pilot causes a change in the pitch of the blades, which change is at least collective but may also be cyclic. The anti-torque rotor consists, for example, of a rotorcraft tail rotor, or, for hybrid helicopters, at least one propulsive propeller. The pilot may be an operator who manually controls various command units, and/or may be a device, such as in particular an autopilot, that provides piloting assistance.

To assist the pilot, rotorcraft are equipped with onboard instrumentation that provides various pieces of information about the forward modes and/or about the environment outside the rotorcraft.

In the field of aeronautics, the onboard instrumentation currently includes measurement instruments for determining the current airspeeds of aircraft, namely, the longitudinal airspeed $LAS_{Vx}$ and the lateral airspeed $LAS_{Vy}$. The concepts of "longitudinal" and "lateral" are commonly accepted notions within the context of the overall orientation of the aircraft. The airspeed-measurement instruments consist, in particular, of anemometric probes located outside of the aircraft, which provide static-pressure and dynamic-pressure information, based on which an airspeed of the aircraft is determined.

One problem that arises for rotorcraft is the lack of reliability and pertinence of the information provided by the anemometric probes when the rotorcraft is moving forward at low speeds. Furthermore, the installation of probes on the outside of the rotorcraft affects its aerodynamics, which should be avoided. Moreover, the information provided by the probes depends, on the one hand, on the orientation of the probes on the rotorcraft, which makes their positioning difficult, and, on the other hand, on the orientation of their installation on the rotorcraft.

Nevertheless, it is useful and even necessary to provide to the pilot of the rotorcraft, in a stationary and/or low-speed flight regime, information about the airspeeds and about the direction of the rotorcraft in terms of its attitude in relation to the flow of the surrounding air. Such information is useful, in particular, to indicate the intensity and/or direction of the wind, and even to warn of in-flight hazards that might be induced by a backwind component.

To solve this problem, VIMI ["Vitesse Indiquée par Moyens Internes"] (Speed Indicated by Internal Means) or AVC ["Anémométrie Vectorielle Calculée"] (Calculated Vectorial Anemometry) calculation systems have been proposed that make it possible to determine the airspeeds of a rotorcraft based on simplified theoretical flight-mechanics formulas.

Such theoretical formulas take into consideration, in particular, various pieces of information provided by the onboard instrumentation, such as instruments that indicate the positions of flight controls and/or indicate the accelerations of the rotorcraft. For example, the calculation systems still uses information supplied by probes mounted on the axis of rotation of the main rotor, or mounted at the end of the blades of such a rotor.

For example, according to document FR 2885222 (THALES S. A.), a law for estimating the airspeeds of a rotorcraft is defined according to a combination of various pieces of measurement information supplied by the onboard instrumentation. Such information relates to a measurement of the pressure of the air outside the rotorcraft; the position of the kinematic chain employed to vary the pitch of the main rotor blades in order to determine the attitude of the rotorcraft; and an acceleration of the equipment, as measured on the basis of an onboard inertial measurement unit.

As a further example, according to document FR 2613078 (CROUZET), a pair of laws makes it possible to calculate the current airspeeds of the rotorcraft based on airspeeds measured in flight onboard a test rotorcraft, taking into consideration various calculation criteria relating to the pitch of the rotor blades of the rotorcraft, to the acceleration of the rotorcraft, and to the inclination of rotorcraft in pitch and roll.

As yet a further example, according to document EPO 402224 (AVIONIC SEXTANT), a calibration operation is performed in flight onboard a test rotorcraft to estimate the airspeeds of a rotorcraft in accordance with various criteria. Then, laws for the calculation of such airspeeds of any rotorcraft that is analogous to the test rotorcraft are constructed on the basis of the results of the calibration operation.

The VIMI calculation systems require a calibration of the simplified theoretical formulas, which calibration consists of a modest adaptation of these simplified theoretical formulas. Such a calibration is performed for each of the rotorcraft on which the systems are present, so as to obtain satisfactory accuracy and reliability with regard to the determined airspeeds. The law governing the estimation of the airspeeds, as incorporated into the calculation system, is calibrated during test flights of the rotorcraft. More specifically, the pertinence and reliability of the application of the estimation law depend on the structural characteristics of the rotorcraft instruments that are used to apply the estimation law.

Consequently, in order to take into account the dependence, the parameters of the estimation law must be calibrated on the basis of test flights performed for each of the rotorcraft onboard which the calculation system is specifically present. Such calibration operations are cumbersome, lengthy, and expensive.

BRIEF SUMMARY OF THE INVENTION

The goal of the present invention is to propose a procedure for the determination of the current airspeeds of a rotorcraft performing evolutions in stationary flight and/or at low speeds. Specifically, the airspeeds to be determined are a longitudinal airspeed $LAS_{V_x}$ and a lateral airspeed LASVy, respectively.

Such a calculation system includes, in particular, a calculator that executes a calculation rule on the basis of which the current airspeeds of the rotorcraft are determined. The execution calculator is associated with measurement instruments that are present on board the rotorcraft and that provide input data for the execution of the calculation rule.

The goal of the present invention consists of a procedure for the development and execution of such a calculation rule; a device for implementing the procedure; and a calculation system and its implementation method. Such a calculation system incorporates an execution calculator equipped with the calculation rule, as previously developed based on the implementation of the procedure.

In contrast to the customary practice in the field, the present invention specifically seeks to avoid a calibration of the calculation rule (that is, an adjustment of the coefficients of the calculation rule) for each of the rotorcraft that is a member of a given family and onboard which the calculation system is specifically installed, inasmuch as such a calibration is traditionally performed during flight tests that are conducted specifically on board each of these rotorcraft.

Consideration should be given to the distinction between a family of rotorcraft that includes multiple rotorcraft of a given type that have a similar overall structure and similar behavior and performance, and a test rotorcraft or a specific rotorcraft that is a member of such a family of rotorcraft and onboard which such calculation systems, intended specifically for them, are installed.

The procedure according to the present invention is a calculation procedure followed by the display of the current airspeeds of a specific rotorcraft performing evolutions in stationary flight and/or at low speeds. Specifically, the current airspeeds are a longitudinal airspeed $LAS_{V_x}$ and a lateral airspeed $LAS_{V_y}$, respectively.

The procedure includes an operation for the development of a calculation rule for the current airspeeds, which development operation includes a test-flight operation on board a rotorcraft and an operation for the integration of the calculation rule into an onboard execution calculator. The execution calculator that incorporates the calculation rule is associated with measurement instruments located on board the specific rotorcraft.

An operation for executing the specific calculation rule on board the specific rotorcraft during flight makes it possible to determine the current airspeeds based on measurement information provided by the measurement instruments of the specific rotorcraft. After the current airspeeds have been calculated based on the execution of the calculation rule, an operation is performed to display the current airspeeds, using display means that are present on board the specific rotorcraft and that are in communication with the execution calculator.

In particular, the calculation rule is developed by construction means that include a calculator and calculation parameters that were entered beforehand and stored by an operator in construction memory means.

More specifically, the calculation rule, as developed, is incorporated by an operator into memory means associated with the execution calculator installed on board the specific rotorcraft, in association with the onboard instruments with which a rotorcraft is traditionally equipped for other purposes, including, in particular, for piloting purposes. The calculator is also placed in communication with the display means. The operation consisting of the preparation of the calculation rule includes a test-flight operation on board a rotorcraft, without the specification, at this point in the description of the present invention, of the type of rotorcraft or of the nature of the operations performed during the course of these test flights.

According to the present invention, such a procedure is primarily identifiable due to the fact that it includes the following sequential operations:

a) The operation for developing the calculation rule includes, in particular, the following specific operations:

The development, by means of the construction calculator, of a pair of first polynomial laws for the calculation of estimated airspeeds. The estimated airspeeds consist, respectively, of an estimated longitudinal airspeed $V_x$ and an estimated lateral airspeed $V_y$ for a modeled rotorcraft in a family to which the specific rotorcraft belongs. The first polynomial laws are constructed through multilinear regression by the construction calculator, in particular, based on information calculated and data entered by an operator in the research office.

More specifically, the first polynomial laws are constructed from parameters relating to simulated flight points, which are stabilized flight states. The parameters are defined by an operator, by means of a flight-mechanics calculation system referred to hereinafter as a "flight simulator". The flight simulator includes, in particular, a simulation calculator that makes it possible to implement a model. Such a flight model consists of a set of mathematical formulas that correlate flight information and generate algorithms, followed by data-processing programs that are input, for example, into a simulation calculator. The modeled rotorcraft is a virtual rotorcraft consisting of a set of parameters, including, in particular, aerodynamic parameters, that characterize any one of the rotorcraft belonging to the family of rotorcraft, with the set of parameters being introduced into the flight model that is used.

In this regard, reference may usefully be made to the document by YEW CHAI PAW et al. entitled "Development and application of an integrated framework for small UAV flight control development," published MECHATRONICS, Vol. 21, No. 5 (August, 2011 (2011-08)), pages 789-802, XP028226794, which describes procedures for the use of such a flight simulator.

The operator uses the flight simulator to perform tests and calculations, thereby obtaining a set of data about stable low-speed flight regimes, which data will subsequently be used to develop the first polynomial laws through multilinear regression. The first polynomial laws that are developed are stored by the construction calculator: specifically, through validation and storage by an operator in construction-memory means associated with the construction calculator.

The development of a pair of second polynomial laws, through flight tests, by means of a construction calculator associated with an in-flight test calculator that itself is associated with measurement instruments located on board a rotorcraft that is a member of the same family. The test flights make it possible to generate information about stable low-speed flight regimes, which data will subsequently be used to develop the second polynomial laws, doing so through multilinear regression using the construction calculator.

The second polynomial laws are polynomial laws for the calculation of airspeeds of the test rotorcraft, as determined through multilinear regression by means of the construction calculator, based on the estimated airspeeds, namely the estimated longitudinal airspeed $V_x$ and the estimated lateral airspeed $V_y$, as obtained through the application of the first polynomial laws to parameters relating to points in the test flights, as performed on board the test rotorcraft, on the one hand; and based on the longitudinal airspeed $LAS_{V_x}$ and the lateral airspeed $LAS_{V_y}$ of the test rotorcraft, as obtained by means of the measurement data provided by the measurement instruments located on board the test rotorcraft.

The information about the stable low-speed flight regimes, as derived from the test flights, include, in particular, the longitudinal airspeed $LAS_{V_x}$ and the lateral airspeed $LAS_{V_y}$ of the test rotorcraft, as well as the estimated longitudinal airspeed $V_x$ and the estimated lateral airspeed $V_y$, as calculated by the first polynomial laws activated, in particular, in the construction calculator located on board the test rotorcraft, based on the measurement data provided by the measurement instruments located on board the test rotorcraft.

b) The operation for the integration of the calculation rule specifically includes an operation for the integration into an execution calculator of the first polynomial laws and of the second polynomial laws. This integration operation is followed by an operation for associating the execution calculator with the measurement instruments located on board the specific rotorcraft.

Consideration should be given to the distinction made between the construction calculator that is used to construct the first polynomial laws and the second polynomial laws, and the execution calculator that incorporates the calculation rule that correlates these polynomial laws. The calculator that incorporates the calculation rule is then associated with the measurement instruments of the specific rotorcraft, and accordingly is suitable for determining the airspeeds of the specific rotorcraft, without requiring an operation for the calibration of the calculation rule that pertains specifically to the specific rotorcraft.

More specifically, the calculation rule stored in the construction calculator is transferred and stored in execution-memory means associated with the execution calculator. In particular, this integration operation is performed through the storage, by an operator, of each of the first polynomial laws and each of the second polynomial laws in the execution-memory means. The execution calculator is then installed by the operator on board the specific rotorcraft, in such a way that it is associated, either directly or indirectly, via the particular means available on the rotorcraft, with the measurement equipment on board this specific rotorcraft and with the display means.

c) The operation for the execution of the calculation rule by the execution calculator, during which operation the current airspeeds are determined on the basis of measurement data generated by the measurement instruments of the specific rotorcraft. More specifically, the current airspeeds of the specific rotorcraft—which consist, respectively, of the longitudinal current airspeed $LAS_{V_x}$ and the lateral current airspeed $LAS_{V_x}$—are determined through the execution of the first polynomial laws, which makes it possible to calculate the estimated longitudinal airspeed $V_x$ and the estimated lateral airspeed $V_y$, and then, through the execution of the second polynomial laws, to adjust the estimated airspeeds, which consist respectively of the estimated longitudinal airspeed $V_x$ and the estimated lateral airspeed $V_y$.

The successive execution of the first polynomial laws and of the second polynomial laws is performed spontaneously and iteratively by the execution calculator. Such an execution of the calculation rule is preferably performed while the rotorcraft is operating in a stationary and/or low-speed flight regime that can be detected by the onboard instrumentation of the specific rotorcraft.

d) The final display operation, during which the display means, which are in communication with the execution calculator, display the current airspeeds, consisting respectively of the longitudinal airspeed $LAS_{V_x}$ and the lateral airspeed $LAS_{V_y}$, of the specific rotorcraft. It should be noted that the current airspeeds as displayed may be analogous to the information provided on the basis of the current airspeeds, particularly after the current airspeeds have been processed by filter means, as described hereinbelow.

The calculation rule stored in the execution calculator installed on board any specific rotorcraft consists of the pair of first polynomial laws and the pair of second polynomial laws, which are executed sequentially, by pairs, to determine the current airspeeds of the specific rotorcraft. The adjustment of the estimated airspeeds $V_x$ and $V_y$, as calculated based on the execution of the first polynomial laws, is performed by means of the execution of the second polynomial laws by the execution calculator.

For two specific rotorcraft that are members of the same family, the difference in aerodynamic characteristics is negligible. A single calculation rule that correlates first polynomial laws and the second polynomial laws can be applied for any specific rotorcraft that is a member of the family. In contrast to the customary practices regarding calculation systems of the VIMI or AVC type, the calculation rule according to the present invention is applicable to any specific rotorcraft that is a member of a given family, without requiring a calibration of the calculation rule through specific test flights for each of the specific rotorcraft.

The use of the simulation makes it possible to generate at least one database that accurately describes a set of stable low-speed flight regimes that are part of the flight domain of the rotorcraft. The phase "flight domain of the rotorcraft" refers to the entire range of the various potential in-flight situations of the rotorcraft. Such a database can be constructed at a lower cost than the test flights that would be necessary for the calibration of the calculation rule and that are traditionally performed for each specific rotorcraft.

The first polynomial laws are defined in the workshop by an operator who is not constrained by meteorological conditions or by the availability of a test rotorcraft in order to generate the definition, or by a lengthy immobilization of a test rotorcraft and its crew.

Only the definition of the second polynomial laws, which adjusts the results of the application of the first polynomial laws, requires the use of test flights, which however are limited to a single test rotorcraft that is a member of the family in question, to the exclusion of similar test flights for each specific rotorcraft. The first polynomial laws are determined on the basis of flight models that have been defined for a said given family of rotorcraft of which the specific rotorcraft is a member. The subsequent execution of the first polynomial laws, and then of the second polynomial laws, for a given specific rotorcraft that is a member of this family makes it possible to obtain the current airspeeds for this specific rotorcraft with accuracy, reliability, and relevance.

The current airspeeds, as displayed, are accurate, reliable, and relevant for any specific rotorcraft, regardless of its mass, the flight conditions, or the conditions affecting the longitudinal and lateral centers of gravity of the specific rotorcraft. The definition of the first polynomial laws via simulation in the research office makes it possible to take into consideration a significant number of flight situations—in particular, not only with regard to the inherent characteristics of a rotorcraft that is a member of a given family, but also with regard to the payload characteristics of the rotorcraft, as well as with regard to the altitude of the forward speed of the rotorcraft and the physico-chemical parameters of the outside air, such as its density, its pressure, and its temperature.

The use of flight models in a simulator makes it possible to take into consideration not only a change in the parameters pertaining to the flight mechanics of a rotorcraft that is a member of a family to which the specific rotorcraft belongs, but also the aerodynamic configuration of such a rotorcraft. The same flight model can be used for all of the specific rotorcraft that are members of a single family. The flight models provide optimized representative information about the various parameters that can affect the calculation of the current airspeeds of a specific rotorcraft, taking into consideration complex phenomena such as the interactions between the airflow generated by the rotor or rotors, on the one hand, and the fuselage and/or the aft structures of the rotorcraft, on the other hand.

The construction of the second calculation rule can be performed on the basis of a limited number of test-flight points, which is advantageous in terms of reducing the costs incurred for the implementation of a full test-flight procedure. The use of the flight simulator makes it possible to take into consideration numerous simulated flight points, thereby enabling an improvement, at lower cost, in the results of the airspeed calculations for any specific rotorcraft that is a member of a given family of specific rotorcraft.

The function of the second polynomial laws is limited to an adjustment, if necessary, of the results of the application of the first polynomial laws. Such an adjustment may be necessary in the event of the presence of any discrepancies between the results generated by the flight simulator and the results obtained during actual flights.

The respective values of the airspeeds as determined by the calculation system are accurate. For illustrative purposes, the estimated error is potentially less than 4 knots (Kt).

In particular, the parameters of the simulated flight points are determined by means of a flight model that describes the modeled rotorcraft that is a member of the family, with the flight model having been entered beforehand by an operator. The parameters pertaining to the simulated flight points are stored in a database, so that they can be processed during the development of the first polynomial laws. In particular, the simulated flight points pertain to a plurality of simulated stable flight regimes that are defined by a first grid.

The first polynomial laws are constructed by the construction calculator through multilinear regression, based on data provided by the flight simulator and associated with the simulated flight points. In particular, the first polynomial laws are calculation laws that are presented in the following polynomial form:

$$\begin{cases} V_x = \sum_i C_{\alpha_i} \cdot \alpha_i \\ V_y = \sum_j C_{\beta_j} \cdot \beta_j \end{cases}$$

in which first polynomial laws:

$V_x$ corresponds to an estimated longitudinal airspeed;

$V_y$ corresponds to an estimated lateral airspeed;

$\alpha_i$ and $\beta_j$ are monomials expressed in the following respective forms:

$$\alpha_i = \theta^{a_i} \cdot \phi^{b_i} \cdot DTC^{c_i} \cdot DTS^{d_i} \cdot DTO^{e_i} \cdot DTA^{f_i} \cdot V_z^{g_i} \cdot \sigma^{h_i} \cdot N_r^{k_i}$$

$$\beta_j = \theta^{a_j} \cdot \phi^{b_j} \cdot DTC^{c_j} \cdot DTS^{d_j} \cdot DTO^{e_j} \cdot DTA^{f_j} \cdot V_z^{g_j} \cdot \sigma^{h_j} \cdot N_r^{k_j}$$

where:

$\theta$ corresponds to the pitch attitude of the rotorcraft $\phi$ corresponds to the lateral attitude of the rotorcraft DTC corresponds to the longitudinal cyclic pitch of the blades of a main rotor of the rotorcraft DTS corresponds to the lateral cyclic pitch of the blades of the main rotor DTO corresponds to the collective pitch of the blades of the main rotor DTA corresponds to the collective pitch of the blades of an anti-torque rotor of the rotorcraft The anti-torque rotor may be of the type that is equipped with a fairing, so as to form a fenestron. By analogy, the anti-torque rotor may be replaced by any anti-torque device whose implementation parameters are taken into consideration in a manner analogous to the consideration of the collective pitch of the blades of the anti-torque rotor.

$V_z$ corresponds to the vertical speed of the rotorcraft $\sigma$ corresponds to the density of the air outside the rotorcraft $N_r$ corresponds to the flight regime of the main rotor $i$, $j$, $a_i$, $b_i$, $c_i$, $d_i$, $e_i$, $f_i$, $g_i$, $h_i$, and $k_i$, $a_j$, $b_j$, $c_j$, $d_j$, $e_j$, $f_j$, $g_j$, $h_j$, and $k_j$ are constant parameters defined by an operator of the simulation for the rotorcraft in the given family of rotorcraft $C_{\alpha_i}$ are coefficients applied respectively to the monomials $\alpha_i$ for the rotorcraft in the given family of rotorcraft. The values of the coefficients $C_{\alpha_i}$ are calculated through multilinear regression in relation to a second polynomial law for the calculation of the estimated longitudinal airspeed $V_x$;

$C_{\beta_j}$ are coefficients applied respectively to the monomials $\beta_j$ for the rotorcraft in the given family of rotorcraft; and the values of the coefficients $C_{\beta_j}$ are calculated through multilinear regression in relation to a first polynomial law for the calculation of the estimated lateral airspeed $V_y$.

In particular, the simulated regimes, as considered for the stationary or low-speed flight of a given modeled rotorcraft, are selected by the operator such that they define a first grid based on the values of the following preferred parameters:

the mass of the rotorcraft, considered at least in terms of each of two extreme regimes if not also in terms of at least one median regime;

the position of the center of gravity of the rotorcraft—selectively, intrinsically, and carrying payloads—in terms of each of the longitudinal and lateral orientations of the rotorcraft. In particular, the position of the center of gravity of the rotorcraft carrying payloads is considered at least in terms of each of the two extreme load regimes if not also in terms of at least one median load regime;

altitude, as estimated according to the pressure and temperature of the air outside the rotorcraft, considered at least in terms of each of the two extreme regimes if not also in terms of at least one median regime;

the vertical speed of the rotorcraft, considered at least in terms of an individual descent regime and an individual ascent regime of the rotorcraft, if not also in terms of at least one regime in which the rotorcraft is holding its position;

the estimated longitudinal speed of the rotorcraft, considered at least in terms of each of the two respective maximum forward and backward speeds; and the estimated lateral speed of the rotorcraft, considered at least in terms of each of the two respective maximum right and left speeds of the rotorcraft.

The test-flight points relate, in particular, to a plurality of stable test-flight regimes of the test rotorcraft on board which the construction calculator is located. The current airspeeds, consisting respectively of the longitudinal current airspeed $LAS_{V_x}$ and the lateral current airspeed $LAS_{V_y}$, are measured by the measurement instruments located on board the test rotorcraft, such as a satellite-based location system. The test situations are implemented, for example, with a known wind, and particularly under conditions of no wind, in order to estimate the current airspeeds based on the ground speeds of the test rotorcraft, as measured by the instrumentation installed on board the rotorcraft. For conditions of no wind, the current airspeeds are assumed to be the same as the current ground speeds.

In particular, the second polynomial laws are developed by the construction calculator and are presented in the following polynomial form:

$$\begin{cases} LAS_{V_x} = \sum_m C_m \cdot Vx^{\gamma_m} Vy^{\delta_m} \\ LAS_{V_y} = \sum_n C_n \cdot Vx^{\gamma_n} Vy^{\delta_n} \end{cases}$$

in which second polynomial laws [10], for a test rotorcraft that is a member of the family on board which the calculation system [1] is located:

$LAS_{V_x}$ is the longitudinal current airspeed of the test rotorcraft;

$LAS_{V_y}$ is the lateral current airspeed of the test rotorcraft;

m, n, $\gamma_m$, $\gamma_m$, $\delta_m$, $\gamma_n$, and $\delta_n$ are constant parameters defined by an operator;

$C_m$ are coefficients applied respectively to the monomials $Vx^{\gamma_m} Vy^{\delta_m}$, with the values of the coefficients being calculated through multilinear regression in relation to a second polynomial law for the calculation of the longitudinal current airspeed $LAS_{V_x}$; and $C_n$ are coefficients applied respectively to the monomials $Vx\gamma^n Vy^{\delta_n}$, with the values of the coefficients being calculated through multilinear regression in relation to a second polynomial law for the calculation of the lateral current airspeed $LAS_{V_y}$.

The present invention also relates to a device for the implementation of a procedure such as the one described hereinabove.

The device includes means for the construction of the calculation rule that is implemented in order to determine the current airspeeds $LAS_{V_x}$ and $LAS_{V_y}$ of a specific rotorcraft performing evolutions in stationary and/or low-speed flight regimes, and means for the execution of the calculation rule, installed on board the specific rotorcraft. The device is operated in order to develop the calculation rule, and, more specifically, to construct the first polynomial laws and the second polynomial laws, without being constrained by the traditional calibration procedures that are applied, through test flights, to this specific rotorcraft.

The construction means include a flight simulator that generates the parameters relating to simulated flight points. The flight simulator includes, in particular, means whereby the operator can enter data pertaining to simulated situations and characteristics pertaining to a rotorcraft belonging to the family. First transfer means are employed by an operator to transfer the data resulting from the simulation, and associated with the simulated flight points, from the flight simulator to construction-memory means associated with the construction calculator;

measurement instruments located on board a said test rotorcraft are associated with an in-flight test calculator that generates the test-flight parameters. The construction means also include means whereby the operator can validate parameters relating to the test-flight points, including the corresponding ground speeds. Second transfer means are employed by an operator to transfer these parameters and ground speeds, in particular, from an in-flight test calculator to the construction calculator, and, more specifically, to the construction-memory means associated therewith. The in-flight test calculator is an intermediate calculation tool located between the on-board instrumentation and the construction calculator. The construction calculator may be installed on board the test rotorcraft or else may be located at a facility on the ground. The construction calculator is suitable for developing, through multilinear regression, the pair of first polynomial laws according to the parameters relating to the simulated flight points, and is suitable for developing, through multilinear regression, the pair of second polynomial laws, doing so through the application of the first polynomial laws in accordance with the test-flight parameters;

third transfer means, which make it possible to transfer each of the first polynomial laws and each of the second polynomial laws from the construction-memory means to execution-memory means associated with the execution calculator. Because the calculation rule incorporates the pair of first polynomial laws and the pair of second polynomial laws, the operator employs the third transfer means to incorporate the calculation rule into the execution-memory means; and control means that enable the implementation, by the operator of the simulator, of the various different transfer means and of the construction calculator.

In a preferred embodiment, the execution means include the filter means, which include the means for the detection of an unstable flight regime of the specific rotorcraft, and the smoothing means.

The present invention also relates to a system for the calculation of the current airspeeds, $LAS_{V_x}$ and $LAS_{V_y}$, of a specific rotorcraft in a stationary flight regime and/or at low speeds. The current airspeeds are a longitudinal current airspeed $LAS_{V_x}$ and a lateral current airspeed $LAS_{V_y}$, respectively. The calculation system is suitable for being installed in, and for functioning on board, the specific rotorcraft, based on the execution, by the execution calculator, of a calculation rule developed on the basis of the implementation of the procedure as described herein.

The calculation system includes execution means that include the execution calculator, which is associated with measurement instruments that generate measurement data pertaining at least to the behavior and to the outside environment of the specific rotorcraft. The execution calculator is also associated with means for displaying the current airspeeds, $LAS_{V_x}$ et $LAS_{V_y}$, as determined by the execution calculator. The execution calculator incorporates a calculation rule for the current airspeeds that includes the calculation parameters and that is executable through the use of the measurement data.

The display means make it possible to indicate, to the pilot, the values determined by the calculation system as they pertain to the airspeeds previously calculated by the execution calculator. The execution calculator, or, by analogy, the execution-memory means associated with it, incorporate the calculation rule for the airspeeds ($LAS_{Vx}$ and $LAS_{Vy}$) to be determined, and also include the calculation parameters relating to the measurement data.

The calculation rule correlates two pairs of polynomial calculation laws that can be executed successfully, in pairs, by the execution calculator. A pair of first polynomial laws consists of two laws for the calculation of the estimated airspeeds, consisting respectively of an estimated longitudinal airspeed $V_x$ and an estimated lateral airspeed $V_y$, which calculation laws are developed through the use of a database that stores a plurality of simulated flight points. A pair of second polynomial laws consists of two laws for the calculation of the current airspeeds, consisting respectively of a longitudinal current airspeed $LAS_{Vx}$ and a lateral current airspeed $LAS_{Vy}$, which calculation laws the estimated airspeeds, respectively for the longitudinal airspeed $V_x$ and the lateral airspeed $V_y$, as previously calculated by the first polynomial laws.

In accordance with a preferred embodiment, the calculation system includes filter means relating to the pertinence of the current airspeeds, $LAS_{Vx}$ and $LAS_{Vy}$, as calculated through the application of the calculation rule. The filter means are located between the execution calculator and the display means. The filter means generate information to be displayed by the display means, associated at least with the current airspeeds, which consist respectively of the longitudinal current airspeed $LAS_{Vx}$ and the lateral current airspeed $LAS_{Vy}$, as determined by the execution calculator through the application of the calculation rule.

The filter means preferably include means for detecting an unstable flight regime of the specific rotorcraft. The generation, by the filter means, of a piece of data to be displayed with regard to a warning signal is governed by the detection means. The warning signal corresponds to such an unstable flight regime, as detected.

Further preferably, the filter means include means for smoothing, at a given time interval, the current airspeeds, $LAS_{Vx}$ and $LAS_{Vy}$, as determined by the execution calculator through the application of the calculation rule. A smoothing operation is performed, for example, by refreshing the airspeeds, as calculated by the calculation rule, in accordance with a determined period of time that is equal to the inverse of the designated time interval, or, for example, by means of the calculation and display of a sliding average of the current airspeeds over time. This operation provides reassurance to the crew, while avoiding the display of information that changes rapidly and that reflects useless minor changes that are difficult for the crew to address. The generation, by the filter means, of information to be displayed with regard to the smoothed airspeeds specific rotorcraft, is governed by the smoothing means. The information to be displayed relates more specifically to the smoothed airspeeds specific rotorcraft, which consist of the longitudinal smoothed airspeed $V_{ax}$ and the lateral smoothed airspeed $V_{ay}$, respectively.

According to the procedure described in the present invention, consideration should be given secondarily to an operating phase of the execution calculator installed in any specific rotorcraft that is equipped with the calculation system. In particular, such an operating phase implements the following operations, which are preferably performed at brief regular intervals suitable for the generation of timely information that can be addressed by the pilot of the specific rotorcraft:

the collection and transmission to the execution calculator, by instrumentation located onboard the specific rotorcraft, of measurement data relating to applied flight-point parameters that were defined beforehand according to the parameters relating to the simulated flight points;

the execution of the first polynomial laws by the execution calculator, based on previously collected measurement data, in order to calculate the estimated airspeeds of the specific rotorcraft;

the execution of the second polynomial laws by the execution calculator, based on the estimated airspeeds Vx and Vy, and the calculation of the longitudinal current airspeed $LAS_{Vx}$ and the lateral current airspeed $LAS_{Vy}$, respectively;

preferably, the processing of the data pertaining to the current airspeeds, $LAS_{Vx}$ and $LAS_{Vy}$, by the filter means prior to their display. Such processing generates the information to be displayed regarding at least any one of the pieces of data relating to the smoothed airspeeds $V_{ax}$ and $V_{ay}$ and/or to the warning signal; and the display, through display means, of data relating to the current airspeeds, $LAS_{Vx}$ and $LAS_{Vy}$, of the specific rotorcraft, which data may be analogous to the information to be displayed as a result of the data relating to the current airspeeds, $LAS_{Vx}$ and $LAS_{Vy}$, of the specific rotorcraft. In such a case, the data being displayed will consist of information relating to the smoothed airspeeds, $V_{ax}$ and $V_{ay}$, as generated respectively on the basis of the current airspeeds, $LAS_{Vx}$ and $LAS_{Vy}$, as processed by the smoothing means, and/or information relating to a said warning signal indicating a possible lack of pertinence of the airspeeds of the rotorcraft, as displayed.

During the operating phase of the execution calculator located on board any specific rotorcraft, the procedure preferably includes the following operations:

the detection, by detection means, of an unstable flight regime of the specific rotorcraft; and the calculation processing of the current airspeeds prior to their display, through filter means that generate the data to be displayed by the display means, with the data to be displayed being associated with at least one warning signal indicating the previously detected unstable flight regime.

The operation consisting of the calculation processing of the current airspeeds includes an operation consisting of smoothing, at a given time interval, the current airspeeds, through the use of smoothing means, which smoothing means govern the generation by the filter means of the data to be displayed by the display means regarding smoothed airspeeds, consisting respectively of the longitudinal smoothed airspeed $V_{ax}$ and the lateral smoothed airspeed $V_{ay}$ of the specific rotorcraft.

The calculation system enables the determination of the airspeeds of the rotorcraft without the use of any data supplied by anemometric probes that might be ineffective at a low rotorcraft airspeed. The measurement data transmitted by the measurement instruments to the calculator consists of data currently available on board a rotorcraft for other functions and/or equipment of the specific rotorcraft, thereby avoiding an undesirable increase in the cost of the calculation system.

Nevertheless, the anemometric probes can be employed advantageously as part of the means for detecting a stationary and/or low-speed flight regime of the specific rotorcraft.

It should be understood that the current airspeeds of the specific rotorcraft are advantageously calculated through the application of the procedure according to the present invention in a stationary and/or low-speed flight regime, without ruling out the potential application of the procedure for the calculation of the current airspeeds of the specific rotorcraft in other flight regimes, such as, in particular, cruising-speed regimes.

BRIEF DESCRIPTION OF THE SEVERAL VIEWS OF THE DRAWINGS

Examples of the implementation of the present invention will now be described with reference to the figures on the attached sheet, on which.

DETAILED DESCRIPTION OF THE INVENTION

Figure 1:
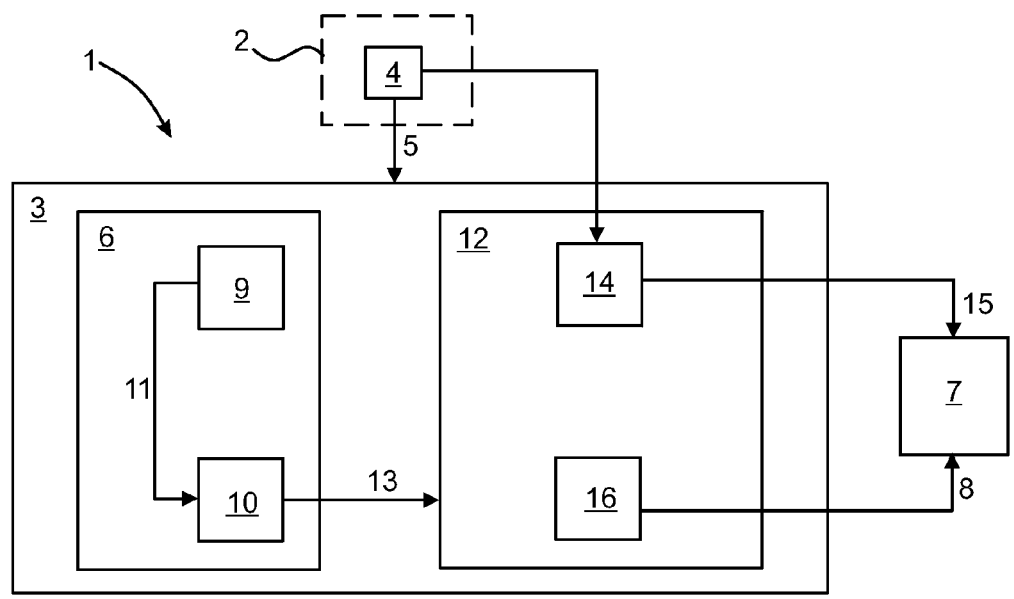
FIG. 1 is a diagram illustrating a calculation system according to a preferred embodiment of the present invention, and its implementation for any specific rotorcraft.

In FIG. 1, a calculation system [1] is organized so as to be loaded on board any specific rotorcraft [2] that is a member of a given family of rotorcraft. This calculation system [1] is organized so as to provide, through a display, to a pilot of the specific rotorcraft [2], data relating to the current airspeeds [13] of the specific rotorcraft [2] in a stationary and/or low-speed flight regime. Specifically, the airspeeds [13] determined by the calculation system [1] are the longitudinal airspeed $LAS_{Vx}$ and the lateral airspeed $LAS_{Vy}$, respectively.

The calculation system [1] includes an execution calculator [3] that is associated with measurement instruments [4] that are part of the on-board instrumentation of the specific rotorcraft [2]. The measurement instruments [4] provide to the execution calculator [3] various pieces of measurement data [5] pertaining to the state of progress and/or to the external environment of the specific rotorcraft [2]. The measurement data [5] transmitted to the execution calculator [3] pertain, for example, to the attitude of the specific rotorcraft [2]; to the cyclic pitch of the blades of a main rotor on board the specific rotorcraft [2]; to the collective pitch of the blades of the main rotor and/or of an anti-torque rotor of the specific rotorcraft [2]; to the vertical speed of the specific rotorcraft [2]; to the operating regime of the motor driving the rotor or rotors; or to the density of the air outside the specific rotorcraft [2].

Such measurement data [5] is provided by measurement instruments [4] with which rotorcraft are currently equipped and that are known in and of themselves. The execution calculator [3] processes the measurement data [5] in order to determine the current airspeeds [13] of the specific rotorcraft [2], doing so through the application of a calculation rule [6] incorporated into the execution calculator [3]. The execution calculator [3] is associated with display means [7], such as a screen or a similar device with which rotorcraft are currently equipped. The display means [7] provide to the pilot of the rotorcraft a display of the data to be displayed [8] regarding the current airspeeds [13] of the specific rotorcraft [2], as previously determined by the execution calculator [3] through the application of the calculation rule [6].

The calculation rule [6] associates two pairs of polynomial calculation laws [9] [10] that are implemented successively in order to calculate the current airspeeds [13] of the specific rotorcraft [3] [sic]. When the calculation system [1] is in operation, and, in particular, when the specific rotorcraft [2] is in a stationary and/or low-speed flight regime, the measurement instruments [4] transmit to the execution calculator [3] pieces of measurement data [5] pertaining to applied flight points. An applied flight point corresponds to the flight state of the specific rotorcraft [2] at a given moment. The transmission of the measurement data [5] may take place continuously or at regular time intervals.

The execution calculator [3] applies a pair of first polynomial laws [9] based on the pieces of measurement data [5] that correspond to the applied flight point, in order to determine the estimated airspeeds [11] consisting respectively of the estimated longitudinal airspeed $V_x$ and the estimated lateral airspeed $V_y$. The estimated airspeeds [11], as calculated by the first polynomial laws [9], are then adjusted, if necessary, through the application of a corresponding pair of second polynomial laws [10], in order to determine the current airspeeds [13] of the specific rotorcraft [2].

The calculation system [1] includes filter means [12] for the current airspeeds [13] of the specific rotorcraft [2] as determined through the application of the calculation rule [6]. The filter means [12] make it possible to increase the relevance and the legibility of the data to be displayed [8] that is transmitted to the display means [7] and that pertains to the calculated current airspeeds.

The current airspeeds of the specific rotorcraft [2] are pertinent in a stable flight regime of the specific rotorcraft [2]. It is desirable to warn the pilot of the specific rotorcraft [2] of any display data that might be erroneous as the result of an unstable flight regime of the specific rotorcraft [2]. For this purpose, the filter means [12] include means [14] for detecting an unstable flight regime of the specific rotorcraft [2], under the control of which means a notice to be displayed with regard to a warning signal [15] is, if necessary, generated.

In a stable flight regime, the act of piloting a rotorcraft continuously causes small variations in the data transmitted by the measurement instruments [4]. Consequently, the airspeeds [13] determined through the application of the calculation rule [6] undergo slight variations. It is desirable for the data displayed with regard to the airspeeds [13] determined by the calculation rule [6] to be stable. This stability of the data display corresponds to the refreshing of the displayed data, which takes place at an interval that is suitable for allowing the data to be interpreted by the pilot of the specific rotorcraft [2]. For this purpose, the filter means [12] include smoothing means [16], at a given time interval, for the calculated airspeeds [13], which smoothing means govern the generation of the data to be displayed [8] regarding the smoothed airspeeds $V_{ax}$ and $V_{ay}$. The smoothed airspeeds $V_{ax}$ and $V_{ay}$ are based on the airspeeds [13] determined by the calculation rule [6] and processed by the smoothing means [16]. The smoothed airspeeds consist of a longitudinal smoothed airspeed $V_{ax}$ and a lateral smoothed airspeed $V_{ay}$, respectively.

Figure 2:
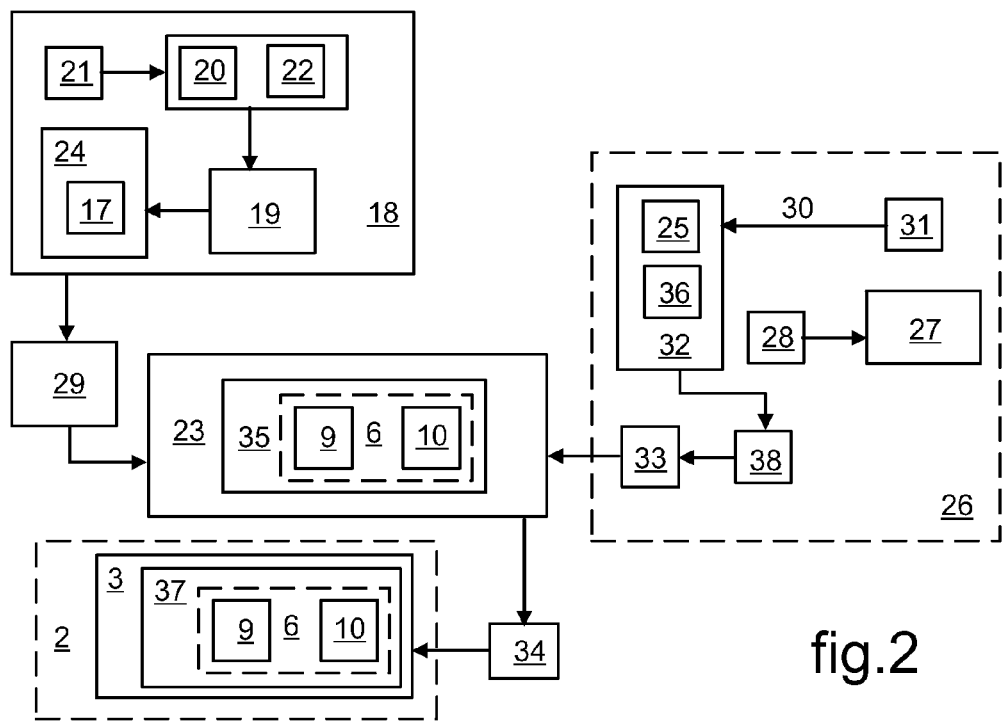
FIG. 2 is a diagram illustrating a calculation system as shown in FIG. 1, and its implementation for defining a calculation rule that is incorporated into an execution calculator included in the calculation system.

FIG. 2 illustrates an operation for the development of the calculation rule [6], and, more specifically, the development of the first polynomial laws [9] and of the second polynomial laws [10], in operations that are separate from the definition of these polynomial laws.

The first polynomial laws [9] are defined in the workshop through multilinear regression based on simulated flight points [17]. A flight simulator [18] is employed to define simulated flight points [17]. The simulated flight points [17] are determined through the application of flight models [19] based on various simulated stable flight regimes [20] applied in accordance with the characteristics of a modeled rotorcraft [22] that is a member of a given family. The family is the one to which the specific rotorcraft [2] belongs, on board which specific rotorcraft the calculation system [1] in its operating phase, as illustrated in FIG. 1, is located.

Data-entry means [21] allow an operator to parameterize the various simulated regimes [20]. The simulated regimes [20] are processed through the application of flight models [19] in order to construct a first database [24] containing the parameters of the various simulated flight points [17]. Based on the results of the simulation, the parameters of the simulated flight points [17] stored in the first database [24] are processed by a construction calculator [23] to define the first polynomial laws [9] through multilinear regression. First transfer means [29] are implemented to transmit the values of the parameters of the simulated flight points [17] to construction memory means [35] associated with the construction calculator [23].

The pertinence and reliability of the results for the estimated airspeeds, as obtained by calculation from these first polynomial laws, must be adjusted, if necessary, through the application of the second polynomial laws [10], so as to obtain the pertinent and reliable current airspeeds of the specific rotorcraft [2].

The second polynomial laws [10] are defined through multilinear regression based on test-flight points [25] and estimated airspeeds as calculated by the first polynomial calculation laws [9]. The test-flight points [25] are determined during the course of test flights performed on board [sic] a test rotorcraft [26] that is a member of the same family as the modeled rotorcraft taken into consideration by the flight simulator [18] for the definition of the first polynomial laws [9]. The test-flight points [25] correspond to various stable-flight test regimes [27] performed on board [sic] a test rotorcraft [26].

The consideration of a test regime [27] is validated by an operator based on validation means [28], and parameters pertaining to the test-flight points [25] are defined based on pieces of measurement data [30] transmitted by measurement instruments [31] located on board the test rotorcraft [26]. The parameters pertaining to the test-flight points [25] are stored in a second database [32], and are processed in order to calculate the estimated airspeeds [11] through the application of the first polynomial laws [9]. The second polynomial laws [10] are defined through multilinear regression based on the test-flight points [25] and on the previously calculated estimated airspeeds [11]. The second polynomial laws [10] are defined by the construction calculator [23], through the use, if necessary, of a test-flight calculator [38] located on board the test rotorcraft [26]. The function of such a test-flight calculator [38] is based on a collection of data that can be processed on the ground by the construction calculator [23]. The data collected by the test-flight calculator [38] may pertain indiscriminately to the measurement data [5] transmitted by the measurement instruments [4] and/or to the estimated airspeeds [11] calculated by the test-flight calculator [38] through the integration of the first polynomial laws [9]. Because the test flights are conducted with known natural wind, and preferably under conditions of no wind, consideration is given to the ground speeds [36] corresponding to the test-flight points [25], as measured by the measurement instruments [31] located on board the test rotorcraft [26].

Second transfer means [33] are implemented in order to transmit, to the construction memory means [35] associated with the construction calculator [23], the parameters pertaining to the test-flight points [35], including the current airspeeds of the test rotorcraft [25] [sic] as inferred from the ground speeds [36], as measured by the construction calculator [23] or, via analogy, by the test-flight calculator [38]. Based on the execution of the first polynomial laws [9] by the calculator [23] and of the data collected through test flights, the construction calculator [23] develops the second polynomial laws [10].

Following the development of the calculation rule [6] that incorporates the first polynomial laws [9] and the second polynomial laws [10], third transfer means [34] transmit the calculation rule [6] to execution memory means [37] associated with an execution calculator [3] intended to be installed in a specific rotorcraft.

Consideration should be given to the fact that the current airspeeds of the specific rotorcraft, as calculated on the basis of the calculation system with which the specific rotorcraft is equipped, can be used by various different pieces of equipment on board the rotorcraft, including, for example and in particular, by equipment intended to assist the piloting of the rotorcraft, by the autopilot, or by analogous equipment.

What is claimed is:

1. A procedure for calculating and displaying current airspeeds of a specific rotorcraft in low-speed evolutions, with the current airspeeds consisting respectively of a longitudinal current airspeed $LAS_{V_x}$ and a lateral current airspeed $LAS_{V_y}$, the procedure including:
   an operation for the development of a calculation rule for the current airspeeds, which development operation includes a test-flight operation on board a rotorcraft and an operation for the integration of the calculation rule into a calculator associated with measurement instruments on board the specific rotorcraft; and
   an operation for executing, during flight on board the specific rotorcraft, the calculation rule for determining the current airspeeds based on measurement information provided by the measurement instruments of the specific rotorcraft, and an operation for displaying the current airspeeds through display means on board the specific rotorcraft; wherein:
   a) the operation for executing the calculation rule includes:
   the development, by means of a construction calculator, of a pair of first polynomial laws for the calculation of estimated airspeeds, comprising respectively an estimated longitudinal airspeed $V_x$ and an estimated lateral airspeed $V_y$, for a modeled rotorcraft in a family to which the specific rotorcraft belongs, with the first polynomial laws being constructed through multilinear regression by the construction calculator, based on parameters relating to simulated flight points defined by means of a flight simulator;
   the development, through test flights by means of the construction calculator in conjunction with a test-flight calculator which itself is associated with measurement instruments on board a test rotorcraft that is a member of the family, of a pair of second polynomial laws for the calculation of the airspeeds of the test rotorcraft, as determined through multilinear regression by means of the construction calculator, based on the estimated airspeeds, namely the estimated longitudinal airspeed $V_x$ and the estimated lateral airspeed $V_y$, as obtained through the application of the first polynomial laws to parameters relating to points in the test flights, as performed on board the test rotorcraft, on the one hand; and based on the longitudinal airspeed $LAS_{V_x}$ and the lateral airspeed $LAS_{V_y}$ of the test rotorcraft, as obtained by means of the measurement data provided by the measurement instruments located on board the test rotorcraft;
   b) the integration operation including the integration into an execution calculator of the first polynomial laws and of the second polynomial laws, with the integration operation being followed by an operation for associating the execution calculator with the measurement instruments located on board the specific rotorcraft;
   c) during the execution operation, the current airspeeds are determined based on measurement data generated by the measurement instruments, through the execution of the first polynomial laws enabling the calculation of the estimated airspeeds, consisting respectively of the estimated longitudinal airspeed $V_x$ and the estimated lateral airspeed $V_y$, and then through execution of the second polynomial laws adjusting the estimated airspeeds; and d) during the final display operation, the display means, which are in communication with the execution calculator, display the current airspeeds, consisting respectively of the longitudinal airspeed $LAS_{Vx}$ and the lateral airspeed $LAS_{Vy}$, of the specific rotorcraft.

2. A procedure according to claim 1, wherein the parameters of the simulated flight points are determined by means of a flight model that describes the model rotorcraft, with the flight model being entered beforehand by an operator and with the parameters relating to the simulated flight points being stored in a database and being associated with a plurality of simulated regimes reflecting stabilized flight, as defined by a first grid.

3. A procedure according to claim 1, wherein the first polynomial laws are constructed by the construction calculator based on the following polynomial form:

$$\begin{cases} V_x = \sum_i C_{\alpha_i} \cdot \alpha_i \\ V_y = \sum_j C_{\beta_j} \cdot \beta_j \end{cases}$$

in which:
$V_x$ corresponds to an estimated longitudinal airspeed [11];
$V_y$ corresponds to an estimated lateral airspeed [11];
$\alpha_i$ and $\beta_j$ are monomials expressed in the following respective forms:

$\alpha_i = \theta^{a_i} \cdot \phi^{b_i} \cdot DTC^{c_i} \cdot DTS^{d_i} DT0^{e_i} \cdot DTA^{f_i} \cdot V_z^{g_i} \cdot \sigma^{h_i} \cdot N_r^{k_i}$ $\beta_j = \theta^{a_j} \cdot \phi^{b_j} \cdot DTC^{c_j} \cdot DTS^{d_j} DT0^{e_j} \cdot DTA^{f_j} \cdot V_z^{g_j} \cdot \sigma^{h_j} \cdot N_r^{k_j}$ where:
$\theta$ corresponds to the longitudinal attitude of the rotorcraft
$\phi$ corresponds to the lateral attitude of the rotorcraft
DTC corresponds to the longitudinal cyclic pitch of the blades of a main rotor of the rotorcraft
DTS corresponds to the lateral cyclic pitch of the blades of the main rotor
DTO corresponds to the collective pitch of the blades of the main rotor
DTA corresponds to the collective pitch of the blades of an anti-torque rotor of the rotorcraft
$V_z$ corresponds to the vertical speed of the rotorcraft
$\sigma$ corresponds to the density of the air outside the rotorcraft
$N_r$ corresponds to the flight regime of the main rotor
i, j, $a_i$, $b_i$, $c_i$, $d_i$, $e_i$, $f_i$, $g_i$, $h_i$, and $k_i$, $a_j$, $b_j$, $c_j$, $d_j$, $e_j$, $f_j$, $g_j$, $h_j$, and $k_j$ are constant parameters defined by an operator of the simulation for the rotorcraft in the given family of rotorcraft
$C_{\alpha_i}$ are coefficients applied respectively to the monomials $\alpha_i$ for the rotorcraft in the given family of rotorcraft, with the values of the coefficients $C_{\alpha_i}$ being calculated through multilinear regression in relation to a first polynomial law for the calculation of the estimated longitudinal airspeed $V_x$; and
$C_{\beta_j}$ are coefficients applied respectively to the monomials $\beta_j$ for the rotorcraft in the given family of rotorcraft, with the values of the coefficients $C_{\beta_j}$ being calculated through multilinear regression in relation to a first polynomial law for the calculation of the estimated lateral airspeed $V_y$.

4. A procedure according to claim 2, wherein the simulated regimes, as considered for the low-speed flight of a given modeled rotorcraft, are selected by the operator such that they define a first grid based on the values of the following parameters:
the mass of the rotorcraft, considered at least in terms of each of two extreme regimes if not also in terms of at least one median regime;
the position of the center of gravity of the rotorcraft—selectively, intrinsically, and carrying payloads—in terms of each of the longitudinal and lateral orientations of the rotorcraft, with the position of the center of gravity of the rotorcraft carrying payloads being considered at least in terms of each of the two extreme load regimes if not also in terms of at least one median load regime;
altitude, as estimated according to the pressure and temperature of the air outside a rotorcraft, considered at least in terms of each of the two extreme regimes if not also in terms of at least one median regime;
the vertical speed of the rotorcraft, considered at least in terms of an individual descent regime and an individual ascent regime of the rotorcraft, if not also in terms of at least one regime in which the rotorcraft is holding its position;
the estimated longitudinal speed of the rotorcraft, considered at least in terms of each of the two respective maximum forward and backward speeds; and
the estimated lateral speed of the rotorcraft, considered at least in terms of each of the two respective maximum right and left speeds.

5. A procedure according to claim 1, wherein the points in the test flight are associated with a plurality of test regimes involving the stabilized flight of the test rotorcraft on board which the construction calculator is located, with the current airspeeds, consisting respectively of the longitudinal airspeed $LAS_{Vx}$ and the lateral airspeed $LAS_{Vy}$, being measured by the measurement instruments located on board the test rotorcraft.

6. A procedure according to claim 1, wherein the second polynomial laws are developed by the construction calculator and are presented in the following polynomial form:

$$\begin{cases} LAS_{Vx} = \sum_m C_m \cdot Vx^{\gamma_m} Vy^{\delta_m} \\ LAS_{Vy} = \sum_n C_n \cdot Vx^{\gamma_n} Vy^{\delta_n} \end{cases}$$

in which second polynomial laws, for a test rotorcraft that is a member of the family on board which the calculation system is located:
$LAS_{Vx}$ is the longitudinal current airspeed of the test rotorcraft;
$LAS_{Vy}$ is the lateral current airspeed of the test rotorcraft [26];
m, n, $\gamma_m$, $\delta_m$, $\gamma_n$, and $\delta_n$ are constant parameters defined by an operator;
$C_m$ are coefficients applied respectively to the monomials $Vx^{\gamma_m} Vy^{\delta_m}$, with the values of the coefficients being calculated through multilinear regression in relation to a second polynomial law for the calculation of the longitudinal current airspeed $LAS_{Vx}$; and $C_n$ are coefficients applied respectively to the monomials $Vx^{\gamma_n}Vy^{\delta_n}$, with the values of the coefficients being calculated through multilinear regression in relation to a second polynomial law for the calculation of the lateral current airspeed $LAS_{Vy}$.

7. A procedure according to claim 1, wherein during the operating phase of the execution calculator located on board any specific rotorcraft, the procedure includes the following operations:

the collection and transmission to the execution calculator, by onboard instrumentation of the specific rotorcraft, of measurement data relating to applied flight-point parameters that were defined beforehand according to the parameters relating to the simulated flight points;

the execution, by the execution calculator, of the first polynomial laws, based on previously collected measurement data, in order to calculate the estimated airspeeds Vx, Vy of the specific rotorcraft;

the execution of the second polynomial laws, by the execution calculator, based on the estimated airspeeds Vx and Vy, and the calculation of the current airspeeds $LAS_{Vx}$ and $LAS_{Vy}$ of the specific rotorcraft; and the display, through display means, of data relating to the current airspeeds of the specific rotorcraft.

8. A procedure according to claim 7, wherein during the operating phase of the execution calculator located on board any specific rotorcraft, the procedure includes the following operations:

the detection, by detection means, of an unstable flight regime of the specific rotorcraft; and the calculation processing of the current airspeeds prior to their display, through filter means that generate the data to be displayed by the display means, with the data to be displayed being associated with at least one warning signal indicating the previously detected unstable flight regime.

9. A procedure according to claim 8, wherein the operation consisting of the calculation processing of the current airspeeds includes an operation consisting of smoothing, at a given time interval, the current airspeeds, through the use of smoothing means, which smoothing means govern the generation by the filter means of the data to be displayed by the display means regarding smoothed airspeeds, consisting respectively of the longitudinal smoothed airspeed $V_{ax}$ and the lateral smoothed airspeed $V_{ay}$ of the specific rotorcraft.

10. A device suitable for the implementation of a procedure for calculating and displaying current airspeeds of a specific rotorcraft in low-speed evolutions, with the current airspeeds consisting respectively of a longitudinal current airspeed $LAS_{Vx}$ and a lateral current airspeed $LAS_{Vy}$, the procedure including:

an operation for the development of a calculation rule for the current airspeeds, which development operation includes a test-flight operation on board a rotorcraft and an operation for the integration of the calculation rule into a calculator associated with measurement instruments on board the specific rotorcraft; and an operation for executing, during flight on board the specific rotorcraft, the calculation rule for determining the current airspeeds based on measurement information provided by the measurement instruments of the specific rotorcraft, and an operation for displaying the current airspeeds through display means on board the specific rotorcraft; wherein:

a) the operation for executing the calculation rule includes:
the development, by means of a construction calculator, of a pair of first polynomial laws for the calculation of estimated airspeeds, comprising respectively an estimated longitudinal airspeed $V_x$ and an estimated lateral airspeed $V_y$, for a modeled rotorcraft in a family to which the specific rotorcraft belongs, with the first polynomial laws being constructed through multilinear regression by the construction calculator, based on parameters relating to simulated flight points defined by means of a flight simulator;

the development, through test flights by means of the construction calculator in conjunction with a test-flight calculator which itself is associated with measurement instruments on board a test rotorcraft that is a member of the family, of a pair of second polynomial laws for the calculation of the airspeeds of the test rotorcraft, as determined through multilinear regression by means of the construction calculator, based on the estimated airspeeds, namely the estimated longitudinal airspeed $V_x$ and the estimated lateral airspeed $V_y$, as obtained through the application of the first polynomial laws to parameters relating to points in the test flights, as performed on board the test rotorcraft, on the one hand; and based on the longitudinal airspeed $LAS_{Vx}$ and the lateral airspeed $LAS_{Vy}$ of the test rotorcraft as obtained b means of the measurement data provided by the measurement instruments located on board the test rotorcraft;

b) the integration operation including the integration into an execution calculator of the first polynomial laws and of the second polynomial laws, with the integration operation being followed by an operation for associating the execution calculator with the measurement instruments located on board the specific rotorcraft;

c) during the execution operation, the current airspeeds are determined based on measurement data generated by the measurement instruments, through the execution of the first polynomial laws enabling the calculation of the estimated airspeeds, consisting respectively of the estimated longitudinal airspeed $V_x$ and the estimated lateral airspeed $V_y$, and then through execution of the second polynomial laws adjusting the estimated airspeeds; and d) during the final display operation, the display means, which are in communication with the execution calculator, display the current airspeeds, consisting respectively of the longitudinal airspeed $LAS_{Vx}$ and the lateral airspeed $LAS_{Vy}$, of the specific rotorcraft, wherein the device includes the constructing means for the calculation rule and the means for the execution of the calculation rule both being located on board a specific rotorcraft, the construction means including:

a flight simulator that generates the parameters relating to simulated flight points;

an in-flight test calculator that generates the test-flight parameters; and a construction calculator that is suitable for developing, through multilinear regression, the pair of first polynomial laws, according to the simulated flight points and suitable for developing, through multilinear regression, the pair of second polynomial laws, doing so through the application of the first polynomial laws in accordance with the test-flight parameters.

11. A device according to claim 10, wherein the execution means includes the filter means, which include the detection means for an unstable flight regime of the specific rotorcraft and the smoothing means.

12. A procedure for calculating and displaying respectively a longitudinal current airspeed $LAS_{Vx}$ and a lateral current airspeed $LAS_{Vy}$ of a specific rotorcraft in low-speed evolutions, the procedure including:

an operation for the development of a calculation rule for the current airspeeds, which development operation includes a test-flight operation on board a rotorcraft and an operation for the integration of the calculation rule into a calculator associated with measurement instruments on board the specific rotorcraft; and an operation for executing, during flight on board the specific rotorcraft, the calculation rule for determining the current airspeeds based on measurement information provided by the measurement instruments of the specific rotorcraft, and an operation for displaying the current airspeeds through display means on board the specific rotorcraft; wherein:

a) the operation for executing the calculation rule includes:

the development, by means of a construction calculator, of a pair of first polynomial laws for the calculation of estimated airspeeds, comprising respectively an estimated longitudinal airspeed $V_x$ and an estimated lateral airspeed $V_y$ for a modeled rotorcraft in a family to which the specific rotorcraft belongs, with the first polynomial laws being constructed through multilinear regression by the construction calculator, based on parameters relating to simulated flight points defined by means of a flight simulator;

the development, through test flights by means of the construction calculator in conjunction with a test-flight calculator which itself is associated with measurement instruments on board a test rotorcraft that is a member of the family, of a pair of second polynomial laws for the calculation of the airspeeds of the test rotorcraft, as determined through multilinear regression by means of the construction calculator, based on the estimated longitudinal airspeed $V_x$ and the estimated lateral airspeed $V_y$, as obtained through the application of the first polynomial laws to parameters relating to points in the test flights, as performed on board the test rotorcraft, on the one hand; and based on the longitudinal airspeed $LAS_{Vx}$ and the lateral airspeed $LAS_{Vy}$ of the test rotorcraft, as obtained by means of the measurement data provided by the measurement instruments located on board the test rotorcraft;

b) the integration operation including the integration into an execution calculator of the first polynomial laws and of the second polynomial laws, with the integration operation being followed by an operation for associating the execution calculator with the measurement instruments located on board the specific rotorcraft;

c) during the execution operation, the current airspeeds are determined based on measurement data generated by the measurement instruments, through the execution of the first polynomial laws enabling the calculation of the estimated airspeeds, consisting respectively of the estimated longitudinal airspeed $V_x$ and the estimated lateral airspeed $V_y$, and then through execution of the second polynomial laws adjusting the estimated airspeeds; and d) during the final display operation, the display means, which are in communication with the execution calculator, display the current airspeeds, consisting respectively of the longitudinal airspeed $LAS_{Vx}$ and the lateral airspeed $LAS_{Vy}$, of the specific rotorcraft.

13. A procedure according to claim 12, wherein the parameters of the simulated flight points are determined by means of a flight model that describes the model rotorcraft, with the flight model being entered beforehand by an operator and with the parameters relating to the simulated flight points being stored in a database and being associated with a plurality of simulated regimes reflecting stabilized flight, as defined by a first grid.

14. A procedure according to claim 12, wherein the first polynomial laws are constructed by the construction calculator based on the following polynomial form:

$$\begin{cases} V_x = \sum_i C_{\alpha_i} \cdot \alpha_i \\ V_y = \sum_j C_{\beta_j} \cdot \beta_j \end{cases}$$

in which:

$V_x$ corresponds to an estimated longitudinal airspeed [11];

$V_y$ corresponds to an estimated lateral airspeed [11];

$\alpha_i$ and $\beta_j$ are monomials expressed in the following respective forms:

$$\alpha_i = \theta^{a_i} \cdot \phi^{b_i} \cdot DTC^{c_i} \cdot DTS^{d_i} DTO^{e_i} \cdot DTA^{f_i} \cdot V_z^{g_i} \cdot \sigma^{h_i} \cdot N_r^{k_i}$$

$$\beta_j = \theta^{a_j} \cdot \phi^{b_j} \cdot DTC^{c_j} \cdot DTS^{d_j} DTO^{e_j} \cdot DTA^{f_j} \cdot V_z^{g_j} \cdot \sigma^{h_j} \cdot N_r^{k_j}$$

where:

$\theta$ corresponds to the longitudinal attitude of the rotorcraft $\phi$ corresponds to the lateral attitude of the rotorcraft DTC corresponds to the longitudinal cyclic pitch of the blades of a main rotor of the rotorcraft DTS corresponds to the lateral cyclic pitch of the blades of the main rotor DTO corresponds to the collective pitch of the blades of the main rotor DTA corresponds to the collective pitch of the blades of an anti-torque rotor of the rotorcraft $V_z$ corresponds to the vertical speed of the rotorcraft $\sigma$ corresponds to the density of the air outside the rotorcraft $N_r$ corresponds to the flight regime of the main rotor $i$, $j$, $a_i$, $b_i$, $c_i$, $d_i$, $e_i$, $f_i$, $g_i$, $h_i$, and $k_i$, $a_j$, $b_j$, $c_j$, $d_j$, $e_j$, $f_j$, $g_j$, $h_j$, and $k_j$ are constant parameters defined by an operator of the simulation for the rotorcraft in the given family of rotorcraft $C_{\alpha_i}$ are coefficients applied respectively to the monomials $\alpha_i$ for the rotorcraft in the given family of rotorcraft, with the values of the coefficients $C_{\alpha_i}$ being calculated through multilinear regression in relation to a first polynomial law for the calculation of the estimated longitudinal airspeed $V_x$; and $C_{\beta_j}$ are coefficients applied respectively to the monomials $\beta_j$ for the rotorcraft in the given family of rotorcraft, with the values of the coefficients $C_{\beta_j}$ being calculated through multilinear regression in relation to a first polynomial law for the calculation of the estimated lateral airspeed $V_y$.

15. A procedure according to claim 12, wherein the simulated regimes, as considered for the low-speed flight of a given modeled rotorcraft, are selected by the operator such that they define a first grid based on the values of the following parameters:

the mass of the rotorcraft, considered at least in terms of each of two extreme regimes if not also in terms of at least one median regime;

the position of the center of gravity of the rotorcraft—selectively, intrinsically, and carrying payloads—in terms of each of the longitudinal and lateral orientations of the rotorcraft, with the position of the center of gravity of the rotorcraft carrying payloads being considered at least in terms of each of the two extreme load regimes if not also in terms of at least one median load regime;

altitude, as estimated according to the pressure and temperature of the air outside a rotorcraft, considered at least in terms of each of the two extreme regimes if not also in terms of at least one median regime;

the vertical speed of the rotorcraft, considered at least in terms of an individual descent regime and an individual ascent regime of the rotorcraft, if not also in terms of at least one regime in which the rotorcraft is holding its position;

the estimated longitudinal speed of the rotorcraft, considered at least in terms of each of the two respective maximum forward and backward speeds; and the estimated lateral speed of the rotorcraft, considered at least in terms of each of the two respective maximum right and left speeds.

16. A procedure according to claim 1, wherein the points in the test flight are associated with a plurality of test regimes involving the stabilized flight of the test rotorcraft on board which the construction calculator is located, with the current airspeeds, consisting respectively of the longitudinal airspeed $LAS_{V_x}$ and the lateral airspeed $LAS_{V_y}$, being measured by the measurement instruments located on board the test rotorcraft.

17. A procedure according to claim 12, wherein the second polynomial laws are developed by the construction calculator and are presented in the following polynomial form:

$$\begin{cases} LAS_{Vx} = \sum_m C_m \cdot Vx^{\gamma_m} Vy^{\delta_m} \\ LAS_{Vy} = \sum_n C_n \cdot Vx^{\gamma_n} Vy^{\delta_n} \end{cases}$$

in which second polynomial laws, for a test rotorcraft that is a member of the family on board which the calculation system is located:

$LAS_{V_x}$ is the longitudinal current airspeed of the test rotorcraft;

$LAS_{V_y}$ is the lateral current airspeed of the test rotorcraft [26];

m, n, $\gamma_m$, $\delta_m$, $\gamma_n$, and $\delta_n$ are constant parameters defined by an operator;

$C_m$ are coefficients applied respectively to the monomials $Vx^{\gamma_m}Vy^{\delta_m}$, with the values of the coefficients being calculated through multilinear regression in relation to a second polynomial law for the calculation of the longitudinal current airspeed $LAS_{V_x}$; and $C_n$ are coefficients applied respectively to the monomials $Vx^{\gamma_n}Vy^{\delta_n}$, with the values of the coefficients being calculated through multilinear regression in relation to a second polynomial law for the calculation of the lateral current airspeed $LAS_{V_y}$.

18. A procedure according to claim 12, wherein during the operating phase of the execution calculator located on board any specific rotorcraft, the procedure includes the following operations:

the collection and transmission to the execution calculator, by onboard instrumentation of the specific rotorcraft, of measurement data relating to applied flight-point parameters that were defined beforehand according to the parameters relating to the simulated flight points;

the execution, by the execution calculator, of the first polynomial laws, based on previously collected measurement data, in order to calculate the estimated airspeeds Vx, Vy of the specific rotorcraft;

the execution of the second polynomial laws, by the execution calculator, based on the estimated airspeeds Vx and Vy, and the calculation of the current airspeeds $LAS_{V_x}$ and $LAS_{V_y}$ of the specific rotorcraft; and the display, through display means, of data relating to the current airspeeds of the specific rotorcraft.

19. A procedure according to claim 18, wherein during the operating phase of the execution calculator located on board any specific rotorcraft, the procedure includes the following operations:

the detection, by detection means, of an unstable flight regime of the specific rotorcraft; and the calculation processing of the current airspeeds prior to their display, through filter means that generate the data to be displayed by the display means, with the data to be displayed being associated with at least one warning signal indicating the previously detected unstable flight regime.

20. A procedure according to claim 19, wherein the operation consisting of the calculation processing of the current airspeeds includes an operation consisting of smoothing, at a given time interval, the current airspeeds, through the use of smoothing means, which smoothing means govern the generation by the filter means of the data to be displayed by the display means regarding smoothed airspeeds, consisting respectively of the longitudinal smoothed airspeed $V_{ax}$ and the lateral smoothed airspeed $V_{ay}$ of the specific rotorcraft.

\* \* \* \* \*